UNITED STATES PATENT OFFICE.

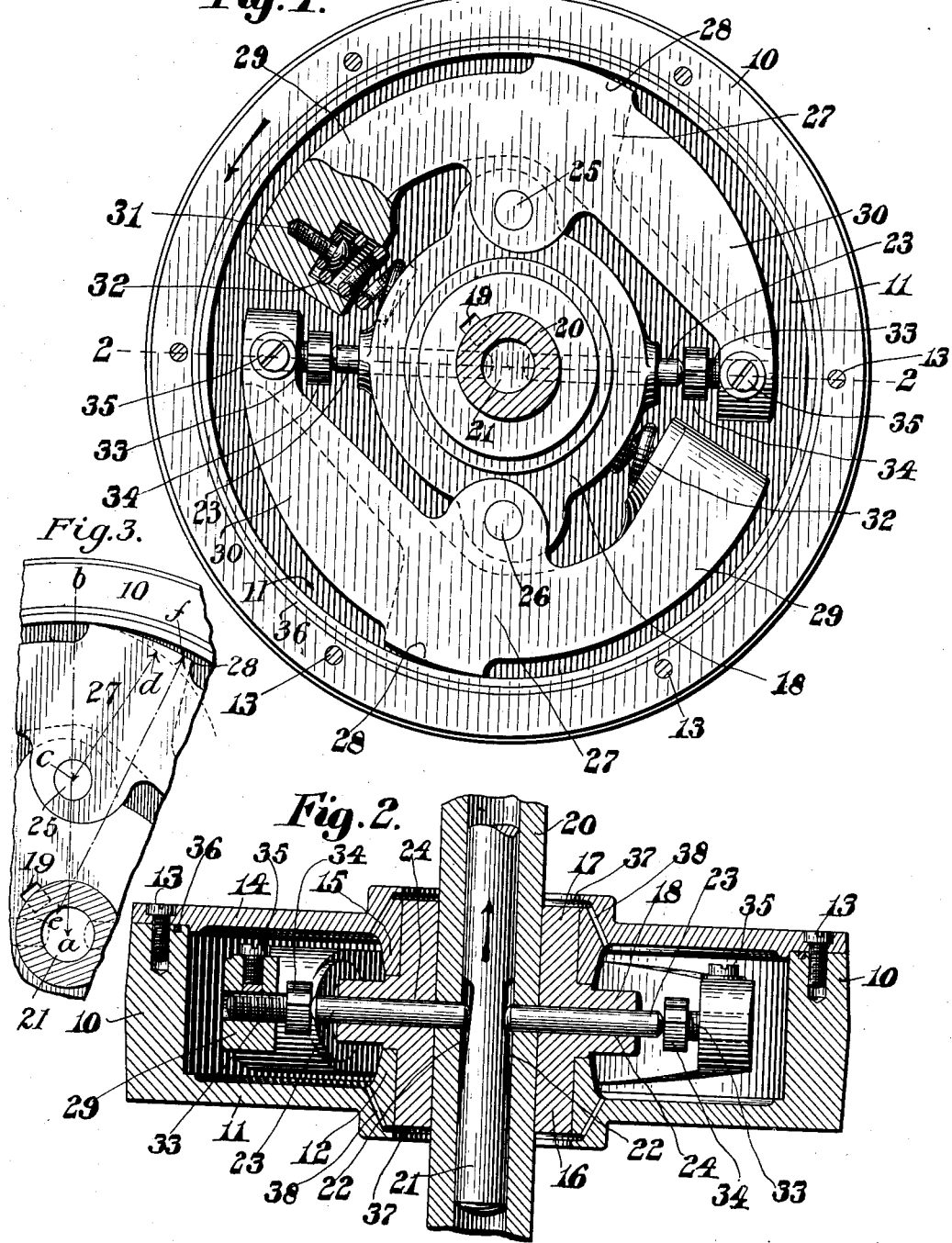

WARREN S. HILL, OF HYDE PARK, MASSACHUSETTS, ASSIGNOR TO CLIFFORD D. PRICKETT, OF HAZARDVILLE, CONNECTICUT.

CLUTCH.

No. 829,525.     Specification of Letters Patent.     Patented Aug. 28, 1906.

Application filed June 27, 1904. Serial No. 214,234.

*To all whom it may concern:*

Be it known that I, WARREN S. HILL, a citizen of the United States of America, and a resident of Hyde Park, in the county of Norfolk and State of Massachusetts, have invented certain new and useful Improvements in Clutches, of which the following is a specification.

This invention relates to clutches, and has for its object the production of a friction-clutch in which will be combined simplicity, durability, and efficiency.

It consists in certain novel features of construction and arrangement of parts, which will be readily understood by reference to the description of the drawings and to the claims to be hereinafter given.

Of the drawings, Figure 1 represents an elevation of a clutch embodying the features of this invention, a portion thereof being shown in section. Fig. 2 represents a central section on line 2 2 on Fig. 1, and Fig. 3 represents a diagram showing the peculiar construction and operation of the clutch-shoe.

In the drawings the numeral 10 represents an outer or driving member consisting of an annular flange formed upon a disk 11, which may be conveniently rotated in any suitable manner in the direction of the arrow shown in Fig. 1 and which is provided with a central hub 12.

The flange 10 has secured to its outer face by means of screws 13 a closing disk or plate 14, having a hub 15, similar to the hub 12, formed on the disk 11, said hubs 12 15 extending inwardly from the disks 11 14. The hubs 12 15 are in axial line, and within them are rotatably mounted the hubs 16 17 of an inner member 18. The disks 11 14 and the peripheral flange 10 form with the inner member 18 a chamber to protect the moving parts from injury and from which all foreign substances are excluded. Within the above-mentioned chamber may be placed any suitable lubricant to prevent any heavy pressure causing abrasion to the different bearing-surfaces within the clutch. Through the center of the member 18 and fixed thereto by means of a key 19 is a shaft 20, through the central bore of which is slidably mounted an actuator 21, having inclined faces 22, engaging with radial connectors 23, slidably mounted in bearings 24, formed in the inner member 18 and the shaft 20. Upon the inner member 18 and articulated thereto by pins 25 26 are toggle members 27, having equal contact faces or shoes 28, said faces being slightly at one side of a radial line drawn through the center of the actuator-shaft and pins 25 26 and in that direction from which the driving member 10 is moving. The frictional face of each shoe 28 is made of a radius somewhat less than that of the inner periphery of the driving member 10 and is so mounted upon the pins 25 26 that said frictional face will be eccentric thereto in order to prevent the edge of the shoe 28 when operating from scraping the lubricant from said inner periphery of the member 10, and thereby cause scoring or grooving thereon.

By reference to the diagram, Fig. 3 of the drawings, it will readily be seen that the toggle member 27 is pivoted at 25 and that the shoe 28 thereon is at all times slightly at one side of a radial line $a\,b$, which passes through the center $c$ of said pivot 25. The forward corner of said shoe 28 moves in the arc of a circle the radius of which is equal to $c\,d$. The outer or working face of said shoe 28 is of a different and a greater radius $e f$, being struck from a center $e$ slightly to one side of the radial line $a\,b$ and forms the arc of a circle the radius of which is somewhat less than the radius of the inner surface of the flange 10. It will therefore be seen that between the arc with the radius $c\,d$ and the arc of the working face of the shoe with the radius $e f$ there is a small wedge-shaped portion. When the toggle member 27 is moved about its pivot 25 to grip upon the member 10, a toggle action is produced with a rapidly-increasing leverage, owing to this wedge-shaped section, and this increasing leverage continues in effectiveness until a certain point has been reached in the length of said shoe, when, owing to the shorter radius of the shoe 28, the forward corner of the working face will have become removed from the interior surface of the member 10 and the toggle action will then become nullified and the shoe will be permitted to slip upon said member to prevent injury to the various parts of the clutch. This action of the shoe produced by having the working surface of said shoe of a slightly less radius than the radius of the inner surface of the member 10 and struck from a point at one side of a radial line through the center of the clutch and the pivot of said shoe produces a result which has heretofore never been accomplished and makes the clutch very effective in its operation.

It is obvious from an inspection of the drawings that when the toggle members 27 are operated to bring the shoes 28 into coöperation with the driving member 10 the latter will operate thereon to straighten the toggle and set the clutch, but that the various parts are so arranged that the shoes can never reach a locking-point. The point of contact never passes beyond the radial line drawn through the center of the actuator 21 and pins 25 26.

The wear upon the coacting shoe and inner periphery of the member 10 is automatically adjusted by the peculiar construction of the face of the shoe 28, which would be worn entirely away before the inner periphery of the member 10 failed to engage the same.

On either side of each shoe 28 are counterbalance members 29 and operating-arms 30. Within the inner end of each counterbalance member 29 and secured thereto by means of the screw 31 is a spring 32, bearing upon the inner member 18, which spring normally holds the shoes 28 from contact with the inner periphery of the driving member 10. To the free end of the operating-arms 30 is secured, by means of a threaded shank 33, a bearing-head 34, coacting with the radial connectors 23, passing through the member 18. To adjust the head 34 within the arm 30, the screw 35 is released and the head 34 is rotated in the desired direction to increase or decrease, as the case may be, the distance between said head 34 and arms 30, when the screw 35 is again made to clamp the shank 33 to prevent any further movement of the same.

To prevent the waste and leakage of the lubricant due to the centrifugal action past the crevice, between the member 10 and disk 14 is a packing-ring 36, and should any leakage occur between the hubs 12 15 and hubs 16 17 upon the member 18 the centrifugal action will cause the lubricant to enter the groove 37 and thence through the passages 38 to the main chamber.

The operation of this clutch is as follows: With the parts in the relation here illustrated the outer member 10 is driven in a suitable manner continuously in one direction, as indicated by the arrow in Fig. 1. A movement is applied in any suitable manner to the actuator 21, causing it to move in the direction of the arrow shown in Fig. 2 to force outwardly the radial connectors 23 in their bearings 24, which connectors coacting with the heads 34, secured to the operating-arms 30, cause the toggle members 27 to contact with the inner periphery of the member 10. The movement of the member 10 in the direction of the arrow tends to straighten the toggle member 27 and insure the rotation of the shaft 20 in unison with the driving member 10. It is therefore obvious that the toggle members 27 will transmit any movement of the member 10 against any load to the inner member 18, rotating the shaft 20 to drive any suitable mechanism. When the shoe 28 is in coöperation with the member 10, the counterbalance member 29 carried thereby approaches the member 18, compressing the spring 31. When a reverse movement other than the above is applied to the actuator 21, the connectors 23, riding down the inclined surfaces 22, will allow the counterbalance member 29 to be operated upon by centrifugal force, assisted by the springs 31, to return the shoe 28 to the normal position, as shown in Fig. 1. To more readily permit the breaking of the toggle by centrifugal action, as described, the end 30 of the toggle-lever is cored and made as light as possible, while the counterbalance member 29 is made quite heavy in contrast thereto, this excess in weight assisting in the operation of breaking the toggle when the movement of the connectors 23 allow this.

The devices for operating the clutch members may be lightly constructed, as the work to be performed thereby is simply to move the shoes 28 into position where the movement of the driving member will act thereon to straighten the toggle and firmly set the clutch. It is also obvious that the power to operate the clutch is derived almost entirely from the driving member, a very little power being required of the operator to move the actuator to cause the shoes to be moved into operative position. This construction makes a very efficient clutch, which is simple in operation and which may be readily operated with but little expenditure of power.

It is believed that the operation of the clutch will be thoroughly understood without further description.

Having thus described my invention, I claim—

1. In a clutch, the combination of a revoluble outer member having an internal working face, a revoluble shaft, an inner member secured thereto, and levers pivoted to said member and provided with shoes having frictional faces eccentric to said internal working face when coöperating therewith, the front or operating edge of each shoe being always at that side of a line passing through the axis of the clutch and the lever-pivot from which the outer member is moving.

2. In a clutch, the combination of a revoluble outer member having an internal working face, a revoluble shaft, an inner member secured thereto, and levers pivoted to said member and provided with shoes having frictional faces eccentric to said internal working face when coöperating therewith, each shoe having its front or operating edge always at a point intermediate the operating end of said lever and a line radial to the axis of said outer member and passing through the lever-pivot.

3. In a clutch, the combination of a revoluble outer member having an internal working face, a revoluble shaft, an inner member secured thereto, levers pivoted to said member and provided with shoes having frictional faces eccentric to said internal working face when coöperating therewith, the front or operating edge of each shoe being always at that side of a line passing through the axis of the clutch and the lever-pivot from which the outer member is moving, an actuator, and connectors interposed between said actuator and said levers and adapted to move said levers to bring the shoes thereon into engagement with the internal face of the outer member.

4. In a clutch, the combination of a revoluble outer member having an internal working face, a revoluble shaft, an inner member secured thereto, levers pivoted to said member and provided with shoes having frictional faces eccentric to said internal working face when coöperating therewith, each shoe having its front or operating edge always at a point intermediate the operating end of said lever and a line radial to the axis of said outer member and passing through said lever-pivot, an actuator, and connectors interposed between said actuator and said levers and adapted to move said levers to bring the shoes thereon into engagement with the internal face of the outer member.

5. In a clutch, the combination of a revoluble outer member having an internal working face, a revoluble shaft, an inner member secured thereto, and levers pivoted to said member and provided with shoes adapted to engage said internal face said shoes having frictional faces struck from a center at one side of a line radial to the internal face of said outer clutch member and passing through the pivot of said shoes and the front edge of said shoe being always at that side of said line from which the outer member is moving.

6. In a clutch, the combination of a revoluble outer member having an internal working face, a revoluble shaft, an inner member secured thereto, levers pivoted to said member and provided with shoes having frictional faces eccentric to said internal working face when in operation therewith, the front or operating edge of each shoe being always at that side of a line passing through the axis of the clutch and the lever-pivot from which the outer member is moving, an arm extending from said lever, and means operating upon the free end thereof to force said working face into engagement with the outer clutch member.

7. In a clutch, the combination of a revoluble outer member having an internal working face, a revoluble shaft, an inner member secured thereto, levers pivoted to said member and provided with shoes having frictional faces eccentric to said internal working face when in operation therewith, the front or operating edge of each shoe being always at that side of a line passing through the axis of the clutch and the lever-pivot from which the outer member is moving, an arm extending from said lever, means operating upon the free end thereof to force said working face into engagement with the outer clutch member, and a spring operating upon said arm to break the connection between said shoes and internal working face.

Signed by me at Boston, Massachusetts, this 20th day of June, 1904.

WARREN S. HILL.

Witnesses:
　WALTER E. LOMBARD,
　A. A. BURNHAM.